UNITED STATES PATENT OFFICE.

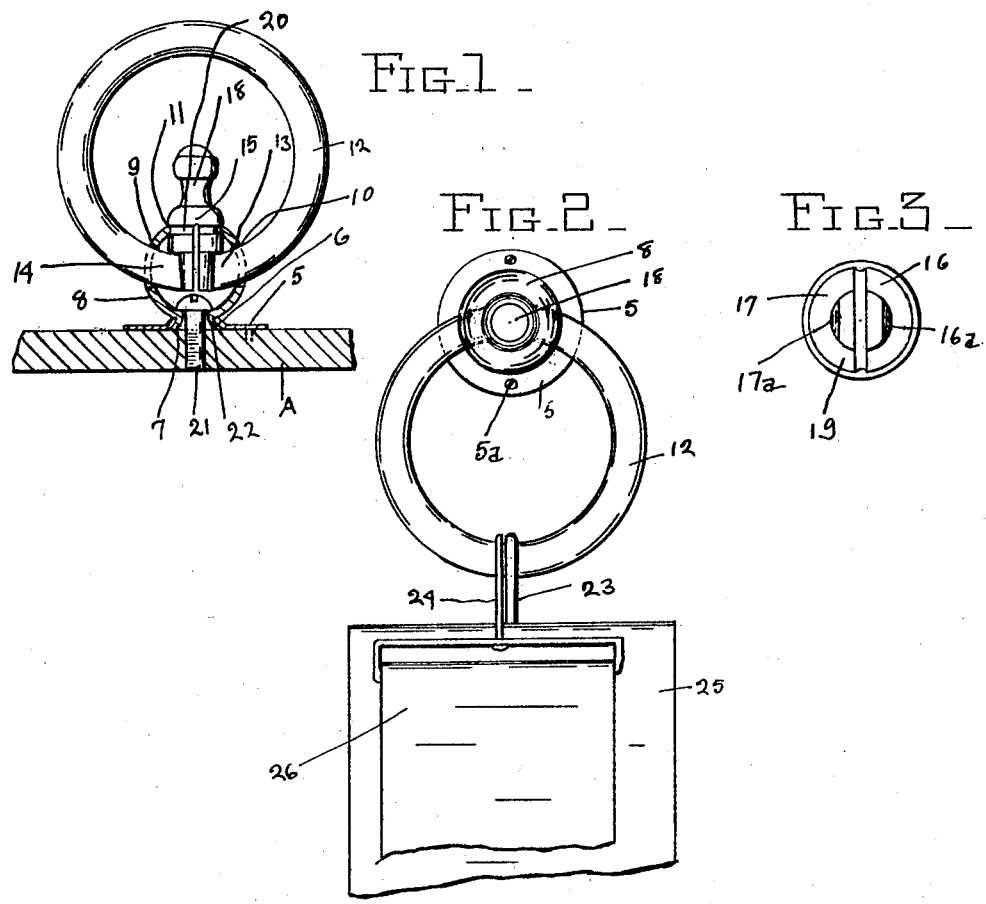

BENJAMIN W. HALL, OF MANCHESTER, NEW HAMPSHIRE.

SWIVEL CONNECTION.

1,401,073.  Specification of Letters Patent.  Patented Dec. 20, 1921.

Application filed September 18, 1919. Serial No. 324,729.

*To all whom it may concern:*

Be it known that I, BENJAMIN W. HALL, a citizen of the United States of America, residing at Manchester, in the county of Hillsboro and State of New Hampshire, have invented certain new and useful Improvements in Swivel Connections, of which the following is a specification.

This invention relates to improvements in swivel connections and is especially designed to provide means for supporting one or more razor strops or the like upon a wall or other stationary support so that the different strops or devices supported can be easily and quickly reversed.

Another object of the invention is to provide a device of this character with means to permit of the quick assembling of the parts or there being taken apart.

With the above and other objects in view this invention relates to certain new and useful constructions, combinations and arrangements of parts, clearly described in the following specification and fully illustrated in the accompanying drawings, in which:

Figure 1 is a view partly in elevation and partly in section showing the construction of the various parts.

Fig. 2 is a front elevation of the device showing a pair of razor strops supported thereby.

Fig. 3 is a detail bottom plan view on an enlarged scale of the locking pin employed with the connection.

Referring to the accompanying drawings 5 designates a base ring which is preferably formed with the central socket 6 in which the flared flange 7 of the hollow ball or spherical member 8 is fitted as by a die pressing or spinning action.

The hollow ball or spherical member 8 is provided with openings 9 and 10 located in opposite sides thereof and in alinement with each other and is also provided with an opening 11 formed in the front end thereof and located medially of the openings 9 and 10.

The ring 12 has its terminal portions 13 and 14 extended through the openings 9 and 10 and spaced apart to receive the locking pin 15, which is provided with a split inner end providing spring jaws 16 and 17, said jaws being provided with beveled faces 16ª and 17ª. The outer portion of the pin 15 projects outwardly of the ball 8 to provide a small handle 18. The body of the pin 15 is provided with a shoulder 19 adapted to engage the inner sides of the ring and is also provided with a circumscribing groove 20 which is adapted to receive the marginal portion of the ball 8 surrounding the opening 11, so that said pin will be held in locked position against accidental displacement in the hollow ball.

When connected to the hollow ball in the manner shown and described the ring can swing on the hollow ball while the ball can be turned on the base plate 5 and it will be impossible for the ring to become disconnected from the ball owing to the locking action of the pin 15 which prevents displacement of the terminals 13 and 14 from the hollow ball.

The base plate 5 may be secured in position by means of a screw or similar device 5ª against rotation, but such a fastening element is not needed as the friction between the plate 5 and the surface of the support engaged thereby will be sufficient to prevent turning of the base plate on the support.

The ball 8 and the socket plate 5 are held to the wall or support A by means of a screw 21 the head of which engages a washer 22 which bears against the base of the ball 8.

The supporting eyes or swivel connections 23 and 24 of the razor strops 25 and 26 are suspended on the ring 12 in the usual manner. The strops may be instantly reversed by rotating the ball 8 on the base plate 5 and the connection of the stops with the ring permits of a free swinging motion thereof or a swivel action of the strop upon its connecting eye.

My invention can also be employed for hammocks and all other articles which are suspended upon stationary supports for a free swinging movement.

Having described my invention, I claim:

1. A swivel connection consisting of a split ring, a member inclosing the ends of said split ring and adapted to permit of a free swinging motion of the ring on said member, and a split pin extending into said member between the ends of said split rings and provided with a recess adapted to have a snap fit with said member to hold said pin in locked position.

2. A swivel connection consisting of a member having oppositely located openings, a split ring having its ends projecting through those openings into the member, a plate having swivel connection with said member, a screw for attaching the member and plate to a support and a pin having one end portion thereof projecting into the member, said end portion being longitudinally split to provide relatively yielding jaws and said jaws being disposed between the ends of the split ring, said pin being provided with a circumscribing recess having a snap fit with the member to retain said jaws in locked position between the ends of the ring.

BENJAMIN W. HALL.